United States Patent [19]

Bradley et al.

[11] 3,980,603

[45] Sept. 14, 1976

[54] MICROSUSPENSION POLYMERIZATION PROCESS TO YIELD VINYL HALIDE POLYMER LATEX INVOLVING DELAYED ADDITION OF BULK MONOMER MIX

[75] Inventors: Basil John Bradley, Barry; Peter James Craig, Dinas Powis; Geoffrey James Gammon, Wenvoe, all of Wales

[73] Assignee: BP Chemicals International Limited, London, England

[22] Filed: Dec. 20, 1974

[21] Appl. No.: 534,798

[30] Foreign Application Priority Data
Dec. 26, 1973 United Kingdom............ 30183/73

[52] U.S. Cl..................... 260/29.6 R; 260/29.6 XA; 526/344; 526/345; 526/909; 526/87; 526/66; 526/79
[51] Int. Cl.²........................................ C08F 114/06
[58] Field of Search............... 260/92.8 W, 87.5 C, 260/29.6 XA, 344, 29.6 R

[56] References Cited

UNITED STATES PATENTS

| | | | |
|---|---|---|---|
| 2,763,635 | 9/1956 | Tucker et al.............. | 260/92.8 W |
| 3,551,399 | 12/1970 | Yonezu...................... | 260/85.5 |
| 3,583,956 | 6/1971 | Pointer..................... | 260/92.8 W |
| 3,661,881 | 5/1972 | Moore....................... | 260/92.8 W |
| 3,725,367 | 4/1973 | Kemp........................ | 260/92.8 W |
| 3,847,855 | 11/1974 | Dawson...................... | 260/92.8 W |
| 3,862,076 | 1/1975 | Dawson et al.............. | 260/29.6 R |

*Primary Examiner*—Joseph L. Schofer
*Assistant Examiner*—Peter F. Kulkosky
*Attorney, Agent, or Firm*—Brooks Haidt Haffner & Delahunty

[57] ABSTRACT

In a microsuspension polymerization of vinyl halide monomer additional monomer is added during the polymerization.

9 Claims, No Drawings

MICROSUSPENSION POLYMERIZATION PROCESS TO YIELD VINYL HALIDE POLYMER LATEX INVOLVING DELAYED ADDITION OF BULK MONOMER MIX

The present invention relates to a process for the microsuspension polymerisation of vinyl halides.

There are three types of aqueous dispersion polymerisation commonly used for vinyl halides. These are often known as suspension, emulsion and microsuspension. Suspension polymerisation uses a monomer soluble free radical initiator and the dispersion droplet size is large, giving polymer particles of a size greater than about 50 $\mu$m, which can be separated from the dispersion by centrifuging or filtering. The dispersion is stabilised by such substances as cellulose ethers, polyvinyl alcohol, gelatin and finely divided inorganic solids such as hydroxy apatite, which are known as dispersants or suspending agents and are not considered to be true surfactants. Stirring is required during polymerisation in addition to the stabilisers to prevent the dispersion collapsing.

Emulsion polymerisation, on the other hand, uses water soluble initiators and the polymer is formed as a latex of particles usually of less than 1 $\mu$m diameter which cannot be separated from the aqueous phase by centrifuging or filtering. True surfactants are used to stabilise the dispersions, which are normally stable on standing, although the polymerisation is stirred.

Microsuspension polymerisations, like suspensions, use monomer soluble initiators but the polymer is formed as a latex of particles usually less than 2 $\mu$m diameter but sometimes up to as much as 20 $\mu$m which cannot be separated from the aqueous phase by centrifuging or filtering. These latices are normally isolated by spray drying to give polymers which can form pastes when mixed with plasticisers. True surfactants are used as stabilisers and often a system containing more than one surfactant or surfactants and surfactant modifiers are used. These dispersions unlike suspensions or emulsions cannot simply be produced by stirring the monomer and water in the presence of the surfactant using the normal degree of agitation required during polymerisation.

In order to obtain polymer particles of the correct size it is necessary in the microsuspension process to subject the mixture of monomer, water and other ingredients of the formulation, to intense shear, for example in an homogenizer, to preform monomer droplets of a size corresponding to that of the polymer to be produced. This is in complete contrast to the emulsion and suspension polymerisation processes in which the size of the particles depends on the formulation and also, in the case of suspension polymerisation, on the agitation used during polymerisation.

When vinyl halides are polymerised in aqueous suspension, it is generally necessary to maintain the polymerisation vessel under pressure as the monomers are gaseous at the usual polymerisation temperatures. However, at a certain conversion, which is about 70% for vinyl chloride, a reduction in pressure, known for the purposes of this application as the "pressure-drop", is observed. This is thought to be the point at which all liquid vinyl halide has been absorbed in the polymer formed and thus only gaseous vinyl halide and vinyl halide dissolved in polymer is present. The pressure then falls below the local saturated vapour pressure of the vinyl halide as the gaseous halide is polymerised.

There are a number of disclosures of the addition of bulk vinyl chloride, i.e. vinyl chloride not previously dispersed in water, during suspension polymerisations of vinyl chloride, for example U.S. Pat. No. 3,661,881 and British patent specification No. 1,348,426. However disclosures of the addition of bulk monomer to suspension and emulsion polymerisations would not be thought relevant to microsuspension polymerisation, which is not carried out by the addition of bulk monomer to water as is the case with emulsion and suspension polymerisation.

Accordingly, the present invention is a batch process for the production of a vinyl halide polymer latex which comprises polymerising a vinyl halide monomer containing material in aqueous microsuspension in the presence of a monomer soluble free radical initiator and adding not more than 40% by weight based on weight of original monomer of bulk vinyl chloride-containing monomeric material during the polymerisation after at least 40% and before 80% of the original monomer has been converted to polymer, the quantity and rate of addition of the monomer being such as to maintain the stability of the latex.

By "bulk" monomer material is meant throughout this specification as monomeric material which is not dispersed or suspended in any way in water.

Any polymerisable vinyl halide-containing monomeric material may be used, but the preferred monomer is vinyl chloride. Co-monomers may be present in either the initially-present or post-added monomeric material in quantities of up to 30% by weight of the total polymerisable monomeric material. Examples of suitable co-monomers are 1,2-dichloroethylenes, trichloroethylene, vinylidene chloride, vinyl acetate, vinyl laurate, vinyl stearate, alkyl vinyl ethers, acrylic acid esters and substituted acrylic acid esters.

It is particularly preferred to homopolymerise vinyl chloride. The polymerisation is carried out in a monomeric material-in-water microsuspension, i.e. in a dispersion produced by a preliminary homogenisation stage in the presence of a surfactant and polymerised by use of a monomer-soluble initiator system.

To produce the microsuspension, the monomer, water and other ingredients in the formulation must be homogenised before the polymerisation by the application of a shear force to produce a dispersion of the required reduced droplet size. A large number of suitable forms of apparatus may be used for homogenisation, for example, a high-speed pump, a colloid mill, an ultra-sonic device, a high speed stirrer, or a high pressure nozzle.

In view of the fact that the homogenisation step largely controls the droplet size and stability of the microsuspension during the subsequent polymerisation, it is surprising that the present invention, which involves the addition of fresh monomer which has not been homogenised, neither destabilises the system nor causes a significant change in the properties of the final dried polymer.

The monomeric material to water phase ratio is not critical provided that sufficient water is present to allow the monomeric material to be maintained in microsuspension therein. Preferably this ratio is in the range 1:0.7 to 1:4 by weight and most preferably 1:0.9 to 1:2.5 by weight.

It is preferred to fully charge the reactor with the monomer water mixture; in other words, the amount of monomer water mixture which is fed to the reactor is that which would normally be fed to the reactor in the absence of any subsequent addition of monomer.

The polymerisation process may be carried out at conventional temperatures used for the polymerisation of vinyl chloride. Suitably a temperature in the range +5° to +75°C is used. The polymerisation temperature may be varied during the reaction.

Suitable initiators include lauroyl peroxide, caprylyl peroxide, benzoyl peroxide, tertiary butyl peroxypivalate, 2-azo-bisisobutyronitrile, 2,2′-azobis-2,4 dimethyl valeronitrile, peroxydicarbonates such as ditertiary-butyl-cyclohexylperoxydicarbonate, diethyl peroxydicarbonate, dicyclohexylperoxydicarbonate and diisopropylperoxydicarbonate. Combinations of the above initiators may also be used.

The quantities of initiator used may be those commonly used in vinyl halide polymerisation processes and the optimum amounts will be readily determined by those skilled in the art.

Surfactants which may be used for stabilising microsuspension polymerisation systems are well-known and include:
alkali metal salts or ammonium salts of fatty acids, alkyl benzene sulphonic acids, paraffinic sulphonic acids, acid aliphatic alcohol sulphuric acid esters and of the sulphosuccinic acid dialkyl esters. Fresh surfactant may also be added together with the extra monomeric material which is added to the polymerisation system.

The polymerisation is carried out in a closed vessel, generally under autogeneous pressure. The vessel is preferably provided with means for agitating the polymerisation reaction mixture, as is conventional in microsuspension reactions. it should be noted that the relatively mild agitation employed is well below the degree of agitation required to form the small particle size dispersion typical of microsuspension.

The monomer is added after at least 40% conversion, i.e. after 40% by weight of the original monomer has polymerised and before 80% conversion of the original monomer. It is particularly preferred to add the monomer at the "pressure drop" which has been referred to earlier.

The monomer is added "at" the pressure-drop when it is added as soon as the fall in pressure has been detected, or within 30 minutes of the beginning of the pressure drop, preferably within 15 minutes.

It is preferred to add the monomer in increments as opposed to bleeding the monomer in continuously in the course of the reaction. Obviously for practical reasons it may not be possible to add the monomeric material instantaneously but the addition of the increment may be spread over a short time, for example not more than 15 minutes preferably not more than 10 minutes.

It is surprising that bulk monomeric material can be added to the microsuspension polymerisation mixture at all without drastic effects on the progress of the polymerisation, but the quantity of monomer and the rate at which the monomer is added should be such as to maintain the stability of the latex. Thus when large amounts of monomer are added, it may be desirable to add it as several increments. It may be desirable to feed the desired quantity of monomer continuously to the polymerisation reaction. It is preferred to feed at least 4% by weight of monomer based on weight of original monomer, and it may be preferred to feed not more than 30% by weight for example not more than 20% by weight of monomer based on weight of original monomer. Once the man skilled in the art has been shown that bulk monomer can be added to microsuspension polymerisation without destroying the stability of the latex he can determine the optimum quantities and rate of addition of monomer by simple tests.

The product from a microsuspension polymerisation is in the form of a latex or slurry, i.e. a suspension of spherical polymer particles, normally with an average diameter of approximately 1 $\mu$m. It is common to recover the polymer from such a latex or slurry by spray drying, and where vinyl chloride is the predominant monomer, to fabricate the dried polymer in mixtures with plasticiser, such mixtures being known as pastes.

It is generally found that by using the method of the present invention an increased solids content latex can be obtained from a batch microsuspension polymerisation without proportional increase in polymerisation time.

The invention is illustrated by the following examples:

EXAMPLE 1

A vinyl chloride polymerisation was carried out in the following manner. A feedstock for microsuspension polymerisation was made up by methods well known in the art by passing vinyl chloride (100 parts) and town's water (125 parts), together with surfactant and monomer soluble initiator, through an homogenising nozzle at 100 atmosphere pressure so that the vinyl chloride droplet size was reduced to approximately one micron. All parts are by weight. The temperature of the agitated suspension was then increased to 48°C and the polymerisation was allowed to proceed at this temperature until the pressure within the polymerisation vessel began to fall.

Fresh vinyl chloride (10 parts) was then injected into the polymerisation vessel and the polymerisation was allowed to continue until the pressure within the vessel had fallen to 60 psig. At this point the vessel and its contents were cooled and the unpolymerised vinyl chloride removed. The polymerisation time was 17 hours 5 minutes, and the total solids content of the latex product was 43.5% wt.

The polymer was isolated by spray-drying and was then ground. A sample of the product was mixed into a paste (formulation:100 parts by weight polymer, 60 parts by weight dioctyl phthalate plasticiser) which had a viscosity of 6100 centipcises as determined with a Brockfield RVT Synchrolectric Viscometer.

COMPARATIVE TEST 1

A further polymerisation was carried out according to the procedure outlined in Example 1, except that no vinyl chloride was injected into the vessel during polymerisation. The total polymerisation time was 17 hours 10 minutes, and the total solids content of the latex product was 40.6% wt.

The paste viscosity, obtained in the manner described in Example 1 was 5200 centipoises.

EXAMPLE 2

A vinyl chloride polymerisation was carried out according to the procedure described in Example 1.

When the conversion of monomer to polymer was approximately 40% 10 parts (based on the weight of original monomer) of fresh vinyl chloride was injected into the reaction mixture, followed by the injection of 0.075 parts of sodium lauryl sulphate surfactant (dissolved in 0.5 parts water). The polymerisation was then allowed to proceed until the pressure within the vessel began to fall. A further 10 parts of fresh vinyl chloride, followed by 0.075 parts of sodium lauryl sulphate in 0.5 parts water, were then injected. The polymerisation was allowed to continue until the pressure in the vessel had fallen to 60 psig. At this point the vessel and its contents were cooled and the unpolymerised vinyl chloride removed. The polymerisation time was 16 hours 15 minutes, and the total solids content of the latex product was 48.0% wt.

EXAMPLE 3

A vinyl chloride polymerisation was carried out according to the procedure described in Example 1.

When the conversion of monomer to polymer was approximately 40% 10 parts (based on the weight of original monomer) of fresh vinyl chloride was injected into the reaction mixture, followed by the injection of 0.075 parts of sodium lauryl sulphate surfactant (dissolved in 0.5 parts water). At approximately 45% conversion a further 10 parts of fresh vinyl chloride, followed by 0.075 parts of sodium lauryl sulphate in 0.5 parts water, were injected. The polymerisation was then allowed to continue until the pressure in the vessel had fallen to 60 psig. At this point the vessel and its contents were cooled and the unpolymerised vinyl chloride removed. The polymerisation time was 17 hours 55 minutes and the total solids content of the latex product was 47.0% wt.

We claim:

1. The batch process for the production of a vinyl halide polymer latex which comprises subjecting a polymerization mixture of a vinyl halide-containing monomeric material to homogenization, polymerizing said mixture in aqueous microsuspension in the presence of a monomer-soluble free radical initiator, and, after at least 40% and before 80% of the original monomeric material has been converted to polymer, adding not more than 40% by weight based on the weight of the original monomeric material of bulk vinyl halide-containing monomeric material at a rate and in a quantity such as to maintain the stability of the latex.

2. The process according to claim 1 wherein the monomeric material is vinyl chloride alone and the polymerisation is a homopolymerisation.

3. The process according to claim 1 wherein the original monomeric material contains up to 30% wt. of a comonomer selected from the group consisting of 1,2-dichloroethylene, trichloroethylene, vinylidene chloride, vinyl acetate, vinyl laurate, vinyl stearate, alkyl vinyl ethers, acrylic acid esters and substituted acrylic acid esters.

4. The process according to claim 3 wherein the quantity of bulk monomeric material added is at least 4% by weight of the original monomeric material.

5. The process according to claim 1 wherein the quantity of bulk monomeric material added is not more than 30% by weight of the original monomeric material.

6. The process according to claim 1 wherein the quantity of bulk monomeric material added is not more than 20% by weight of the original monomeric material.

7. The process according to claim 6 wherein the bulk monomeric material is added as a single increment.

8. The process according to claim 1 wherein when more than 20% by weight based on weight of monomeric material is added it is added as a plurality of increments.

9. The process according to claim 1 wherein an increment of bulk monomeric material is added at the pressure drop.

* * * * *